W. JARGSTORF.
TRIPOD HEAD.
APPLICATION FILED MAY 3, 1915. RENEWED MAY 11, 1916.
1,186,992.
Patented June 13, 1916.
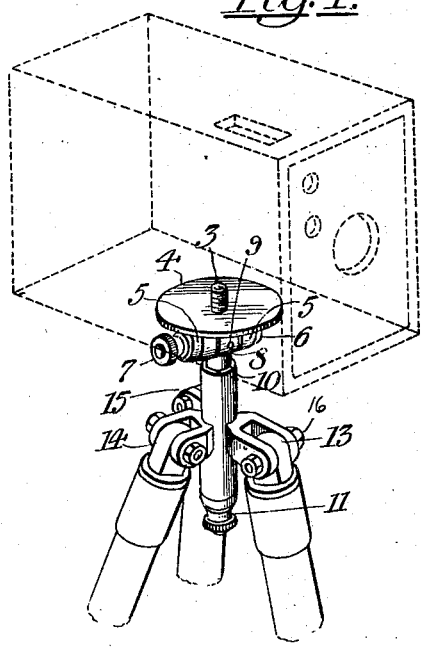
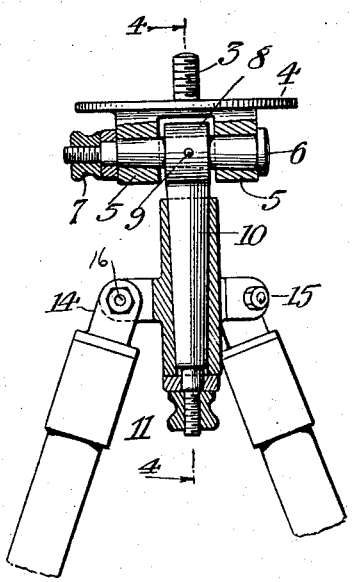
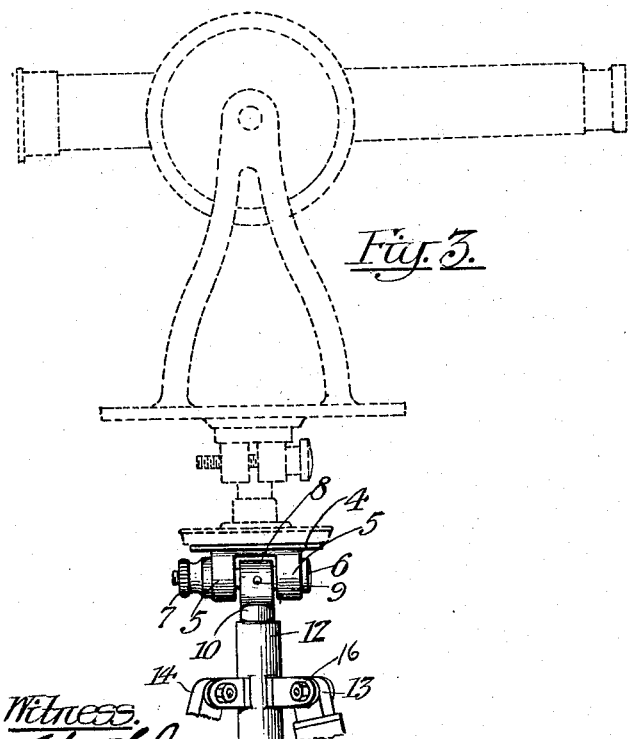
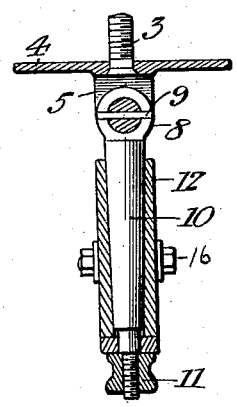
Inventor
William Jargstorf
by his Attorney
Witness
Titus H. Irons

UNITED STATES PATENT OFFICE.

WILLIAM JARGSTORF, OF NEW YORK, N. Y.

TRIPOD-HEAD.

1,186,992.  Specification of Letters Patent. Patented June 13, 1916.

Application filed May 3, 1915, Serial No. 25,650. Renewed May 11, 1916. Serial No. 96,941.

*To all whom it may concern:*

Be it known that I, WILLIAM JARGSTORF, a citizen of the United States, and resident of the borough of Brooklyn, county of Kings, city and State of New York, have invented certain new and useful Improvements in Tripod-Heads, of which the following is a specification.

The device, the subject of this invention, is intended as a means adapted to serve with the legs of an ordinary tripod in adjustably supporting optical, scientific, photographic, and surveying instruments and analogous devices, and has for its special purpose the providing of a means which will allow the instrument to be swiveled upon its central support and to be arranged at an angle to the perpendicular.

I have found that where it is desirable to set an instrument in position on the side of a hill or upon an angled surface it is exceedingly difficult to arrange the instrument upon a proper level, for it ofttimes happens that where an ordinary screw is the securing means between the instrument and the tripod, the instrument cannot be caused to assume the proper direction and yet be firmly secured to the tripod, it sometimes becoming necessary to loosen the instrument upon the tripod, an action found dangerous and quite unsatisfactory.

I have also found that it sometimes occurs that the proper level cannot be given the instrument because of the insecure or peculiar formation of the surface upon which the tripod is to be placed, and it is to overcome the difficulties resulting from these peculiar conditions that I have constructed a tripod head which although secured firmly to an instrument which it supports will allow that instrument to be turned upon a vertical and horizontal axis in the manner which will be fully described in the specification which follows.

The following is what I consider the best means of carrying out this invention and the accompanying drawings form a part of this specification, in which:

Figure 1 is a perspective view of my device, and a camera supported thereby shown in dotted lines. Fig. 2 is a view on a larger scale and in this figure certain portions are shown in section. Fig. 3 is an elevation. Fig. 4 a section on the line 4—4 in Fig. 2.

Similar reference numerals indicate like parts in all of the figures where they appear.

At 1, I have indicated a camera or photographic device and at 2 a surveying instrument. The instrument shown may be of any ordinary construction, shape, style, or size. My device may operate with entire satisfaction with small or large cameras, moving-picture cameras, transits, levels, telescopes or any and all devices which it is desirable to support by means of a tripod, and no change is required in the instrument, it being only necessary to provide means by which the instrument may be secured to the tripod.

Most cameras are provided with a screw threaded socket into which a screw 3 may be secured. This screw in my device is centrally secured in a disk 4 which may be of any desirable size and which may be formed of any preferred material. To the under side of the disk I secure two lugs 5 and 5 separated a certain distance from each other and between these lugs and protruding upon each side thereof, I arrange a tapered pin 6, one end of which is screw threaded and provided with a thumb-nut 7. Between the lugs 5—5 and upon the pin I arrange a block 8 secured to the pin 6 by means of the rivet 9. Formed integral with the block 8 is a vertical staff 10 tapered and having a screw-threaded portion at its lower end upon which is arranged a thumb-nut 11. The staff 10 is passed into and through a tubular member 12 cylindrical upon its exterior and tapered upon its interior, at an angle coincidental with the taper of the staff 10. Upon the exterior of the tubular member 12 and secured thereto I arrange a plurality of blocks 13, 14 and 15. These blocks are split and are each provided with a pivot as indicated at 16, and it is within the blocks and upon the pivots 16 that the legs of the tripod are engaged. I may provide any suitable number of blocks and any suitable number of legs, but I have found that the customary number, three, is in most instances sufficient for all purposes, therefore I have shown three blocks and three legs pivoted therein.

In operating my device a camera or other instrument is secured upon the disk 4, the thumb-screws 7 and 11 are loosened to a slight extent and the camera or other instrument focused and directed as the operator may desire; then, steadying the instrument against accidental displacement the screws 7 and 11 are tightened and the regular operations continued as desired. From this description of its operation it would appear that my device was limited in its usefulness. This is not so, however, as I have found that by its use I may accomplish results with photographic cameras hardly obtainable otherwise. For instance, the camera steady upon the tripod with both of the screws 7 and 11 loosened the operator viewing a moving object in the finder the exposure may be made when the satisfactory point is reached by the object being photographed. In this way it is possible to photograph the flight of an airship in a desired and predetermined position, the movement of trains, horses, and other fast moving objects, and it is possible to follow the movement of a boat by a movement of the camera upon one plane. The thumb-screw, which controls the transverse movement may be secured thus adding to the firmness of the support for the instrument.

The operation just described may be accomplished with most satisfactory results with optical instruments such as field glasses, telescopes and the like when used in conjunction with my support.

In connection with the construction I desire to call attention to the fact that the pin 6 is secured in the block 8, and that the securing of the disk 4 upon its pin is accomplished by forcing the blocks 5—5 upward on the incline or taper of the pin. The vertical axial rotation is controlled by the engagement of the member 12 upon the taper of the member 10. This construction obviates the necessity of disengaging the pins from the parts that they secure, obviates the possibility of the loss of the pivot pins or parts secured thereby and also allows the friction between coincidentally movable parts to be entirely under the control of the operator. I desire it understood, however, that modifications may be made within the scope of the appended claims without departing from the principle or sacrificing the advantages of this invention.

Having thus carefully and fully described my invention what I claim and desire to secure by Letters Patent is:—

1. A tripod head having a horizontal and tapered pin, lugs upon said pin, and provided with tapered perforations for engagement with said pin, a rest upon said lugs, and means for moving said lugs upon said pin to secure a frictional engagement therewith as and for the purpose set forth.

2. A tripod head having a vertical staff, a transverse pin secured at the upper end thereof, lugs upon said pin and a rest secured to said lugs and means for frictionally engaging said lugs with said pin to prevent relative movement thereof as and for the purpose set forth.

3. A tripod head having a tapered staff, a transverse tapered pin secured to the upper end thereof, a disk having lugs partially rotatable upon said pin, and means for temporarily securing said lugs upon said pin to prevent the rotation thereof as and for the purpose set forth.

4. Device of the character described comprising a disk, means for securing a camera to said disk, lugs upon said disk and provided with tapered perforations, a tapered shaft passing through said lugs, and means for temporarily frictionally engaging said lugs upon said shaft, and a staff secured at about midlength of said shaft, the body of said staff being tapered, a tapered cylindrical member for receiving said staff, and means for frictionally engaging said staff in said cylindrical member, and a plurality of lugs upon said staff for receiving the legs of said tripod as herein specified.

Signed at New York city, in the county and State of New York April 21, 1915.

WILLIAM JARGSTORF.

Witness:
G. E. STERRITTE MARR.

Copies of this patent may be obtained for five cents each, by addressing the "Commissioner of Patents, Washington, D. C."